P. H. MURRAY.
SINK CLEANER.
APPLICATION FILED MAR. 4, 1916.
1,201,076.
Patented Oct. 10, 1916.
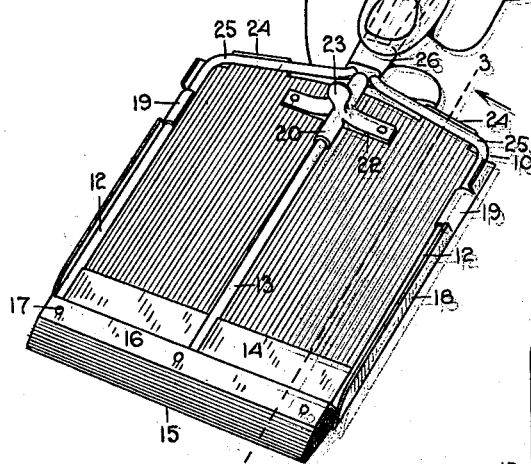
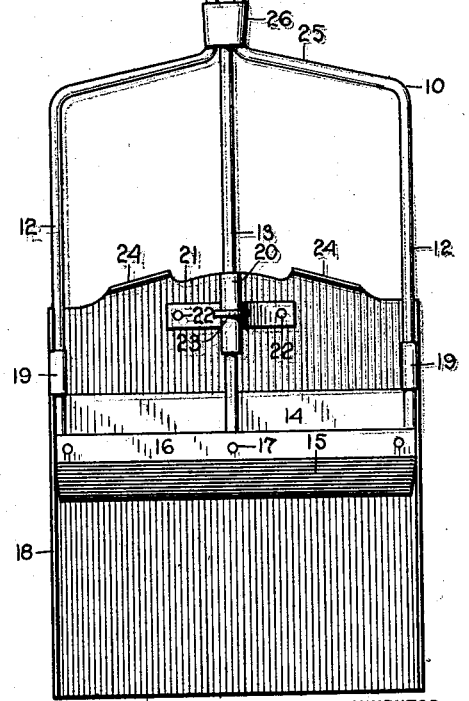
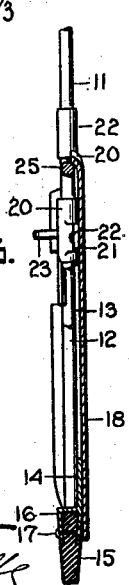
WITNESSES
INVENTOR
Patrick H. Murray
BY
ATTORNEYS

UNITED STATES PATENT OFFICE.

PATRICK HUGH MURRAY, OF FALL RIVER, MASSACHUSETTS.

SINK-CLEANER.

1,201,076.  Specification of Letters Patent.  Patented Oct. 10, 1916.

Application filed March 4, 1916. Serial No. 82,091.

*To all whom it may concern:*

Be it known that I, PATRICK HUGH MURRAY, a citizen of the United States, and a resident of Fall River, in the county of Bristol and State of Massachusetts, have invented a new and Improved Sink-Cleaner, of which the following is a full, clear, and exact description.

My invention relates to a device for cleaning sinks and the like and has for its prime object to provide a device of the indicated purpose involving a scraper and a movable shovel element mounted to be moved to a retracted position to afford no interference with the use of the scraper, or to a position projected beyond the scraper for shoveling the material gathered by the manipulation of the scraper.

The invention will be particularly explained in the specific description following.

Reference is to be had to the accompanying drawings forming a part of this specification in which similar reference characters indicate corresponding parts in all the views.

Figure 1 is a perspective view of a sink cleaner embodying my invention, the shovel element being in the retracted position; Fig. 2 is a plan view showing the shovel projected beyond the scraper element; Fig. 3 is a section on the line 3—3, Fig. 1.

It will be obvious that the body or frame of my improved device may be variously formed to afford support for the scraper and shovel elements. In the illustrated example, I have shown a wire frame, designated generally by the numeral 10, the same being formed into a handle 11 and including side bars 12. In addition, there is a central longitudinal bar 13.

On the forward end of the body 10 is a transversely disposed strip 14 on the front of which is a scraper 15, preferably of rubber, said scraper being secured by forming a clip or clamp member 16 receiving the said scraper which is riveted as at 17 to said clip. The construction is only one of many expedients to secure the scraper in fixed position on the body or frame 10.

A shovel element 18 is slidably mounted on the body, said shovel in the illustrated example, having members 19 sleeved on the side bars 12 to slide thereon. In addition to the elements 19, a sleeve 21 affords additional guided engagement of the shovel 18 on the body or frame. Said sleeve 21 is formed with a finger piece 23 to be grasped by the user for sliding the shovel to the retracted position shown in Fig. 1, which permits of the scraper 15 being effectively employed to scrape the sink and gather material therein together. The shovel is then moved to the projected position, Fig. 2, for shoveling the gathered material.

Ordinarily, the elements, 19, 20, may be relied upon to engage the rods 12, 13 with sufficient friction to maintain the shovel 18 in the retracted position when the device is hung on a nail or the like, which is permitted by reason of the handle 11 being in the form of a loop, or otherwise made to present an opening to receive a nail. To positively insure the retention of the shovel in the raised position, I may provide coacting members on the shovel and body to engage each other when the shovel is in the retracted position, the engagement preferably being frictional. For the purpose mentioned, I have shown upturned members 24 on the shovel adapted to spring over the lateral shoulders presented by the transverse members 25 at the rear end of the frame or body 10.

It will be clear from the foregoing that by the rigid relation of the scraper to the handle and the direct linear movement of the shovel beneath the scraper to the retracted and the projected positions, the construction and operation are the simplest to provide either an effective scraper or an effective shovel to be manipulated in the manner usual with ordinary shovels and scrapers.

Having thus described my invention I claim as new and desire to secure by Letters Patent:

1. A device of the class described including a handle, a scraper rigid with the handle at the front end, and a shovel disposed in a plane substantially parallel therewith, and slidable by direct linear movement in the said plane to a position rearward of the scraper or to a forward position to project beyond the scraper.

2. A device of the class described, including a handle, a scraper rigid with the handle at the front end, a shovel disposed beneath the scraper in a plane substantially parallel therewith, and slidable in the said plane to a position rearward of the scraper or to a forward position in the same plane to project beyond the scraper, longitudinally ranging guide means in fixed relation to the scraper in front of the handle, and means in fixed relation to the shovel and having direct linear sliding movement on the said guide means to dispose the shovel in a forward or retracted position.

3. A device of the class described, including a handle, a transverse scraper element rigid with the handle, guide means between the handle and scraper element and rigid therewith, and a shovel beneath the scraper element and guide means in a plane substantially parallel therewith, said shovel having sliding engagement with the said guide means and having direct linear movement thereon to a position rearward of the scraper element or to a forward position projecting beyond the scraper element.

4. A device of the class described, including a handle, guide rods extending forwardly from the handle, a transverse scraper element rigid with said rods at the front thereof, a shovel beneath the scraper element and rods, and members on the shovel at the rear end slidable on said rods to position the shovel projected beyond the scraper or to a retracted position in the rear of the scraper.

5. A device of the class described, including a handle, guide rods extending forwardly from the handle, a transverse scraper element rigid with said rods at the front thereof, a shovel beneath the scraper element and rods, and members on the shovel at the rear end slidable on said rods to position the shovel projected beyond the scraper or to a retracted position in the rear of the scraper; together with co-acting catch members on the shovel and rigid with the handle to hold the shovel in the retracted position.

In testimony whereof I have signed my name to this specification in the presence of two subscribing witnesses.

PATRICK HUGH MURRAY.

Witnesses:
　IGNATIUS J. KELLY,
　LE BEAU GRUNDY.

Copies of this patent may be obtained for five cents each, by addressing the "Commissioner of Patents, Washington, D. C."